United States Patent
Kim et al.

(10) Patent No.: US 9,074,048 B2
(45) Date of Patent: Jul. 7, 2015

(54) POLYARYLENE SULFIDE AND PREPARATION METHOD THEREOF

(75) Inventors: Sung-Gi Kim, Gyeonggi-do (KR); Jae-Bong Lim, Gyeonggi-do (KR); Se-Ho Lee, Gyeonggi-Do (KR)

(73) Assignee: SK Chemicals Co., Ltd. (KR)

( * ) Notice: Subject to any disclaimer, the term of this patent is extended or adjusted under 35 U.S.C. 154(b) by 116 days.

(21) Appl. No.: 13/582,859

(22) PCT Filed: Mar. 8, 2011

(86) PCT No.: PCT/KR2011/001594
§ 371 (c)(1),
(2), (4) Date: Sep. 5, 2012

(87) PCT Pub. No.: WO2011/111982
PCT Pub. Date: Sep. 15, 2011

(65) Prior Publication Data
US 2012/0329984 A1    Dec. 27, 2012

(30) Foreign Application Priority Data

Mar. 10, 2010    (KR) ........................ 10-2010-0021388

(51) Int. Cl.
*C08G 75/14*    (2006.01)
*C08G 75/02*    (2006.01)
*C08J 5/18*    (2006.01)
*C08G 75/00*    (2006.01)

(52) U.S. Cl.
CPC ........... *C08G 75/02* (2013.01); *Y10T 428/2982* (2015.01); *C08G 75/14* (2013.01); *C08J 5/18* (2013.01); *C08J 2381/04* (2013.01)

(58) Field of Classification Search
CPC ..................................................... C08G 75/14
USPC ................. 528/373, 389, 381, 397; 428/402
See application file for complete search history.

(56) References Cited

U.S. PATENT DOCUMENTS

| 2,513,188 A | 6/1950 | Macallum |
|---|---|---|
| 2,583,941 A | 1/1952 | Gordon, Jr. |
| 4,786,713 A | 11/1988 | Rule |
| 4,792,600 A | 12/1988 | Rule et al. |
| 4,855,393 A | 8/1989 | Rule et al. |
| 8,242,233 B2 | 8/2012 | Lee et al. |
| 2009/0203872 A1 | 8/2009 | Lee et al. |
| 2010/0022743 A1 | 1/2010 | Lee et al. |
| 2012/0329983 A1 | 12/2012 | Kim et al. |

FOREIGN PATENT DOCUMENTS

| CN | 1032663 A | 5/1989 |
|---|---|---|
| CN | 101578321 A | 11/2009 |
| CN | 101595165 A | 12/2009 |
| JP | 2001-031765 A | 2/2001 |
| JP | 2008-201885 A | 9/2008 |
| JP | 2009-248525 A | 10/2009 |
| JP | 2010-501661 A | 1/2010 |
| JP | 2013-522387 A | 6/2013 |
| KR | 10-2008-0018770 A | 2/2008 |
| KR | 10-2008-0064737 A | 7/2008 |
| WO | WO-2006/059059 A1 | 6/2006 |
| WO | WO-2008/082265 A1 | 7/2008 |

OTHER PUBLICATIONS

"Chinese Application Serial No. 201180012876.2, Office Action mailed Jul. 31, 2013", 5 pgs.

"International Application Serial No. PCT/KR2011/001594, International Search Report mailed Nov. 28, 2011", (w/ English Translation), 5 pgs.

*Primary Examiner* — Duc Truong

(74) *Attorney, Agent, or Firm* — Schwegman Lundberg & Woessner, P.A.

(57) ABSTRACT

This disclosure relates to polyarylene sulfide that may exhibit and maintain excellent properties and a method for preparing the same, wherein the polyarylene sulfide is in the form of pellet of 2 to 10 mm size immediately after melt polymerization, and has residual solvent content of 300 ppm or less, based on the total weight of resin.

The polyarylene sulfide may exhibit and maintain excellent properties, particularly it does not generate foam in the product or stain on the surface, has excellent mechanical properties such as tensile strength, and the like, and thus, it may be usefully applied in the industrial field of preparing polyarylene sulfide and manufacturing a molded product using the same.

8 Claims, 1 Drawing Sheet

POLYARYLENE SULFIDE AND PREPARATION METHOD THEREOF

CROSS REFERENCE TO RELATED APPLICATION

This application is a nationalization under 35 U.S.C. 371 of PCT/KR2011/001594 filed Mar. 8, 2011 and published as WO 2011/111982 A1 on Sep. 15, 2011, which application claims priority to and the benefit of Korean Patent Application No. 10-2010-0021388, filed Mar. 10, 2010, which applications and publication are incorporated herein by reference in their entirety.

FIELD OF THE INVENTION

The present invention relates to polyarylene sulfide that may exhibit and maintain excellent properties, and a method of preparing the same.

BACKGROUND OF THE INVENTION

Currently, polyarylene sulfide is representative engineering plastic, and is in great demand for high temperature and corrosive environment and electronic products due to high heat resistance, chemical resistance, flame resistance, and electric insulation. The major uses include computer accessories, automobile accessories, coating of the part contacting corrosive chemical materials, and industrial chemical resistant fiber, and the like.

Presently, polyphenylene sulfide (PPS) is the only commercially available polyarylene sulfide. According to the current commercial production process of PPS, p-dichlorobenzene (pDCB) and sodium sulfide are used as raw materials and reacted in a polar organic solvent such as N-methyl pyrrolidone, and the like. This method is known as a Macallum process, and the basic process is disclosed in U.S. Pat. Nos. 2,513,188 and 2,583,941, wherein some usable polar solvents are suggested but N-methylpyrrolidone (NMP, boiling Temp.; 202~204° C.) is currently most commonly used. This process uses dichloro aromatic compounds as raw material, and sodium chloride (NaCl) is generated as a by-product.

Meanwhile, the PPS obtained in the Macallum process is washed and dried after polymerization reaction, and obtained in the form of powders. The powder PPS produced by these processes may generate considerable outgassing during a subsequent molding process or use, to cause property deterioration compared to immediately after polymerization. In addition, according to the above method, due to decomposition of PPS by residues, for example, moisture, residual reactant or residual organic solvent, and the like in the PPS, stains may be generated on the surface of the injection molded product. Also, to prevent generation of stains on the surface of the injection molded product, the surface of the injection mold should be cleaned often.

Meanwhile, since the outgas contains odor, it may contaminate environment in the work place.

SUMMARY OF THE INVENTION

It is object of the present invention to provide polyarylene sulfide (PAS) that may exhibit and maintain excellent properties.

It is another object of the present invention to provide a method for preparing the polyarylene sulfide.

It is yet another object of the present invention to provide a molded product, a film, a sheet, or fiber manufactured by molding the polyarylene sulfide.

The present invention provides polyarylene sulfide that is in the form of pellets of 2 to 10 mm size immediately after polymerization, and has residual solvent content of 300 ppm or less, based on the total weight of resin.

The present invention also provides a method for preparing polyarylene sulfide including polymerization reacting reactants including diiodide aromatic compounds and sulfur compounds; and drying the polymerized product at 120 to 160° C. for 1 to 2 hours.

The reactant may further include 1 to 20 parts by weight of a polymerization terminator, based on 100 parts by weight of the sulfur compounds.

The polymerization terminator may be at least one selected from the group consisting of diphenyl sulfide, diphenyl ether, biphenyl, benzophenone, monoiodoaryl compound, benzothiazole, benzothiazolesulfenamide, thiuram, dithiocarbamate, and diphenyldisulfide. The diiodide aromatic compound may be at least one selected from the group consisting of diiodobenzene, diiodonaphthalene, diiodobiphenyl, diiodobisphenol, and diiodobenzophenone.

In addition, the melt polymerization reaction may be progressed for 1 to 30 hours while increasing temperature and reducing pressure under the initial reaction conditions of temperature of 180 to 250° C. and the pressure of 50 to 450 torr to the final temperature of 270 to 350° C. and the final pressure of 0.001 to 20 torr. The polymerization reaction may be progressed in the presence of a nitrobenzene based catalyst.

The present invention also provides a product manufactured by molding the polyarylene sulfide.

DETAILED DESCRIPTION OF THE INVENTION

Figure 1:
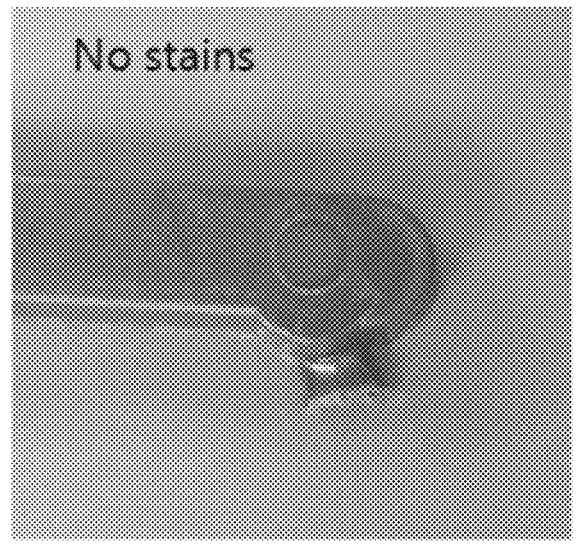
FIG. 1 is a photograph showing the surface of the injection molded specimen compounding polyarylene sulfide resin and glass fiber according to one Example.

Hereinafter, the present invention will be explained in detail.

As the results of repeated studies on polyarylene sulfide that may exhibit and maintain excellent properties, the inventors completed the present invention.

According to the existing preparation method, dichloro aromatic compounds and sodium sulfide, and the like are polymerization reacted in the presence of an organic solvent such as N-methylpyrrolidone (NMP) to prepare polyarylene sulfide, and after the polymerization reaction, washing and drying processes for removing sodium chloride (NaCl) and oligomer are conducted to obtain powder polyarylene sulfide. However, the powder polyarylene sulfide may generate considerable outgassing during a subsequent molding process or use, and thus, when produced into a final product, it may exhibit bad properties. In addition, according to the method, deterioration of properties of the polymer including mechanical properties is observed due to decomposition of polyarylene sulfide by residual reactants or residual organic solvents in the polyarylene sulfide. Further, the existing method has problems of generating stains on the surface of injection molded product or pollutant on the surface of mold due to the outgassing, and to prevent the stains and pollutant on the surface of injection molded product, an injection molding process should be stopped, and the injection mold should be cleaned often. In addition, it has a disadvantage that the outgassing causes odor and contaminates the environment of work space.

The residual solvents in the polyarylene sulfide prepared by the existing process include moisture (water), phenol, N-methylpyrrolidone (NMP), butyrolactone, and the like. Meanwhile, the term 'residual solvent' herein is defined to include moisture (water) and organic solvents. Particularly, according to the present invention, N-methylpyrrolidone (NMP) is not included in the residual solvent.

Meanwhile, to overcome the above problems, during the studies on polyarylene sulfide that may exhibit equal or more excellent properties, compared to immediately after polymerization, when subjected to a drying process or molding process or used as a molding product after polymerization, the inventors found out that if polymerized polyarylene sulfide is in the form of pellets of a certain size instead of powders and has residual solvent content of 300 ppm or less in the polymerized resin, it may exhibit and maintain excellent properties.

The polyarylene sulfide may be prepared by the following preparation method, wherein polyarylene sulfide may be easily obtained by polymerizing reactants including monomers and drying for a short time, without using a separate organic solvent as a reaction medium. Namely, contrary to the polyarylene sulfide polymerized by the existing method, which is in the form of powders immediately after polymerization, the polyarylene sulfide according to the above embodiment of the invention is in the form of pellets having a size above a certain level, immediately after polymerization. In addition, since the polyarylene sulfide does not use an organic solvent as a reaction medium during polymerization and is in the form of pellets of a certain size immediately after polymerization, the surface area contacting the air is relatively small, water uptake from the air is not high after drying, and thus, residual solvent content is very low.

In addition, the polyarylene sulfide generates small outgassing during a molding process or use of the molded product, and decomposition of polyarylene sulfide by the residual organic solvent in the resin and the resulting deterioration of properties occur little.

The polyarylene sulfide according to one embodiment of the invention has a size (average particle diameter) of 2 to 10 mm, preferably it is in the form of pellets immediately after polymerization, and has residual solvent content of 300 ppm or less, compared to the total weight of the resin.

Since the polyarylene sulfide of the present invention is in the form of pellets immediately after polymerization, and has the minimum residual organic solvent content of 300 ppm or less, it has relatively small specific surface area, and thus, energy and time required for a drying process may be shortened. In addition, since the polyarylene sulfide has the minimum residual organic solvent, foaming in the resin by the residual solvent during a drying or molding process or use, and the resulting outgassing and deterioration of properties occur little.

Unless otherwise described, the expression 'immediately after polymerization' refers to a 'resin prepared by polymerizing reactants including monomers and drying for a short time (at a temperature of from 140° C. to 160° C. for 1 to 2 hours)', and means before conducting subsequent melt processing or molding process.

In addition, the 'size of pellet' is defined as the largest values among various measurement values of the length, width, thickness or diameter of the pellets of polyarylene sulfide immediately after polymerization. Meanwhile, the 'size of pellet' may be calculated by measuring the average particle diameter of the resin in the form of pellet obtained 'immediately after polymerization', and for example, the average particle diameter may be measured with Vernier Calipers as described in the following Experimental Example, and calculated.

In the present invention, the residual solvent may include water and an organic solvent, however, since an organic solvent is not used as a polymerization solvent, the residual solvent is mostly water. Thus, in the residual solvent content of 300 ppm or less, the organic solvent content may be 0 to 0.1 ppm, and the remaining content may be moisture (water). Most preferably, the polyarylene sulfide of the present invention may have organic solvent content of 0 ppm.

In addition, the polyarylene sulfide may have number average molecular weight of 3,000 to 1,000,000, preferably 3,000 to 50,000. In addition, the polyarylene sulfide may have relatively uniform dispersion degree of 2.0 to 4.0, which is defined by weight average molecular weight to number average molecular weight.

The polyarylene sulfide having the above number average molecular weight and/or degree of dispersion may be manufactured into various products according to the molecular weight or melt viscosity.

The polyarylene sulfide according to the above embodiment exhibits excellent thermal stability, and it may have a melting point (Tm) of 265 to 320° C., preferably 268 to 290° C., more preferably 270 to 285° C. By securing the melting point (Tm) in the high range, the polyarylene sulfide of the present invention may exhibit excellent properties including high strength and improved heat resistance when applied as engineering plastic.

In addition, when the polyarylene sulfide according to the above embodiment is compounded with 40 wt % of glass fiber, and injection molded after maintaining the mold at 140° C., visible stains are hardly observed on the surface of the injection molded specimen. The 'stain' refers to marks of other colors or spots mixed with the original basis of the specimen surface.

In addition, the thermal properties of the polyarylene sulfide may be maintained without significant change during use or before and after molding, and thus, it may be usefully applied in the field of molding products such as home heating appliances, LED lamp socket and motor insulator, and the like, which require excellent thermal stability.

Also, the polyarylene sulfide according to the above embodiment exhibit higher tensile strength compared to the case where the existing resin is injection molded. In addition, the mechanical properties of the polyarylene sulfide may be maintained without significant change before and after molding or during use, and thus, it may be usefully applied in the field of molding automobile accessories, housing of electronic equipment, and CD laser pickup sliding housing, and the like, which require high mechanical strength.

Meanwhile, according to another embodiment of the invention, there is provided a method for preparing the polyarylene sulfide of the above explained embodiments, including polymerization reacting reactants including diiodide aromatic compounds and sulfur compounds; and drying the polymerized product at 120 to 160° C. for 1 to 2 hours.

According to the above preparation method, an organic solvent is not used as a reaction medium, and reactants including monomers are polymerized to prepare polyarylene sulfide. Thus, there is no need to progress a process of removing an organic solvent after polymerization reaction, and polyarylene sulfide in the form of pellets instead of powders may be readily obtained without a separate processing or molding process.

The polyarylene sulfide in the form of pellets has small area contacting the air, and thus, has very low content of residual solvent including moisture. Particularly, according to the present invention, polyarylene sulfide that is in the form of pellets of a certain size and has low residual solvent content may be obtained by optimizing a drying process of polyarylene sulfide after polymerization.

Meanwhile, in the polymerization reaction step, the reactants may further include a polymerization terminator. The polymerization terminator may be included in the content of 1 to 20 parts by weight, based on 100 parts by weight of the sulfur compounds. If the content of the polymerization terminator is less than 1 part by weight, effect by adding the polymerization terminator may be insignificant, and if it is greater than 20 parts by weight, polyarylene sulfide having too low molecular weight may be prepared.

The polymerization terminator is not limited as long as it may remove a iodine group in the polymer to terminate polymerization, but preferably, it may be at least one selected from the group consisting of diphenyl sulfide, diphenyl ether, biphenyl (or diphenyl), benzophenone, monoiodoaryl compounds, benzothiazole, benzothiazolesulfenamide, thiuram, dithiocarbamate and diphenylsulfide. More preferably, the polymerization terminator may be at least one selected from the group consisting of iodobiphenyl, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N-dicyclohexylbenzothiazole-2-sulfenamide, tetramethylthiuram monosulfide, tetramethylthiuram disulfide, Zinc dimethyldithiocarbamate, Zinc diethyldithiocarbamate, Dibenzothiazyl Disulfide (benzothiazyl Disulfide) and diphenyl disulfide.

More preferably, the polymerization terminator may be diphenyl suldife, diphenyl ether, dibenzothiazole disulfide, or biphenyl, wherein a functional group between phenyls functions as an electron donor, thus exhibiting higher reactivity of polymerization reaction.

Meanwhile, the diiodide aromatic compounds that may be used for the polymerization reaction of polyarylene sulfide may include diiodobenzene (DIB), diiodonaphthalene, diiodobiphenyl, diiodobisphenol, diiodobenzophenone, and a combination thereof, but are not limited thereto, and compounds pertaining to diiodide aromatic compounds wherein an alkyl group or a sulfone group, and the like is additionally bonded as a substituent group, or heteroatom such as oxygen or nitrogen, and the like is contained in the aryl compound may be also used. The diiodide aromatic compounds may be in the form of various isomers according to the bonding position of iodine atoms, and compounds such as pDIB, 2,6-diiodonaphthalene, or p,p'-diiodobiphenyl, wherein iodines are symmetrically bonded at both ends at the farthest distance may be most preferable.

Furthermore, sulfur compounds that may be used are not limited. Commonly, sulfur exists as cyclooctasulfur (S8) at room temperature, but any other commercially available solid state sulfur may also be used.

In addition, the diiodide aromatic compounds may be used in the content of 1000 to 1400 parts by weight, based on 100 parts by weight of the sulfur compounds. If the content of the diiodide aromatic compounds is less than 1000 parts by weight, side reactions may occur, and if it is greater than 1400 parts by weight, it may be difficult to heat the reactor to a desired temperature.

Meanwhile, the polymerization reaction condition is not limited as long as it may initiate a polymerization of reactants including diiodide aromatic compounds, sulfur compounds and a polymerization terminator. Preferably, the polymerization may be progressed under temperature-increasing and pressure-reducing conditions, and in this case, the polymerization reaction may be progressed for 1 to 30 hours while increasing temperature and reducing pressure under the initial reaction conditions of temperature of 180 to 250° C. and the pressure of 50 to 450 torr to the final temperature of 270 to 350° C. and the final pressure of 0.001 to 20 torr.

If the polymerization reaction is progressed under temperature-increasing and pressure-reducing conditions, thermal stability may be excellent, and even when applied for recycling, melt viscosity change rate is 0, and thus, mechanical properties may be equal to or more excellent, compared to before recycling.

Meanwhile, the method for preparing polyarylene sulfide according to the above explained embodiment may further include a step of melt mixing the reactants. The melt mixing conditions are not limited as long as it may melt mix all the reactants, but preferably, the melt mixing may be progressed at a temperature of 130 to 200.

By conducting melt mixing before polymerization, melt polymerization may be more easily achieved.

Meanwhile, the polymerization reaction may be progressed in the presence of a nitrobenzene-based catalyst. In addition, if a melt mixing step is conducted before the polymerization reaction, the catalyst may be added in the melt mixing step. It is confirmed that if polyarylene sulfide is polymerized in the presence of a nitrobenzene-based catalyst, polyarylene sulfide having higher melting point may be prepared compared to the polymerization in the absence of a catalyst. If the melting point of polyarylene sulfide is low, there is a problem in heat resistance of the product, and thus, to prepare polyarylene sulfide requiring heat resistance, a polymerization reaction may be progressed in the presence of a nitrobenzene-based catalyst. The nitrobenzene-based catalyst may include 1,3-diiodo-4-nitrobenzene, or 1-iodo-4-nitrobenzene, and the like, but is not limited thereto.

The polyarylene sulfide prepared by the above explained method is in the form of pellets with a size (average particle diameter) of 2 to 10 mm immediately after melt polymerization, and it has residual solvent content of 300 ppm or less, based on the total weight of the resin.

In addition, the properties of the polyarylene sulfide prepared by the above explained method including number average molecular weight, dispersion degree defined by weight average molecular weight to number average molecular weight, melting point, content of residual solvent including water and organic solvent, tensile strength, and the like are as mentioned above in the embodiment of polyarylene sulfide.

According to yet another embodiment of the invention, there is provided a product manufactured by molding the polyarylene sulfide. The molded product may be in the form of a film, a sheet, or fiber. The polyarylene sulfide may be processed into various molded products by injection molding, extrusion molding, and the like. The molded product may be an injection molded product, extrusion molded product, or blow molded product. In the case of injection molding, mold temperature may be preferably 30 or more, more preferably 60 or more, still more preferably 80 or more in terms of crystallization, and it may be preferably 190 or less, more preferably 170 or less, still more preferably 160 or less in terms of modification of test piece. In addition, the molded product may be used as electric and electronic parts, construction element, automobile parts, machine parts or daily necessities, and the like. In addition, the injection molded products may be compounded with filler such as glass fiber or mineral filler, and the like, and then, molded. The filler content is not limited, but to increase mechanical strength including tensile strength, and the like while maintaining excellent properties of polyarylene sulfide resin, the filler may be included in the content of 10 to 70 wt %, preferably 30 to 65 wt % in the total compounding composition. Besides, the molded product may include commonly used additives such as lubricant or oxidation stabilizer, and the like, but the kinds and contents are not limited.

If the molded product is provided as a film or sheet, it may be made into various films or sheets including undrawn, uniaxially drawn, biaxially drawn film, sheet, and the like. If the molded product is fiber, it may be made into various fiber including undrawn, drawn, ultra-drawn fiber, and the like, which may be used as woven fabrics, knitting, non-woven fabrics (spoon bond, melt blow, staple), rope, net, and the like.

The polyarylene sulfide may exhibit and maintain excellent properties, particularly it does not generate foam in the product or stain on the surface, has excellent mechanical properties such as tensile strength, and the like, and thus, it may be usefully applied in the industrial field of preparing polyarylene sulfide and manufacturing molded product using the same.

Hereinafter, the present invention will be explained in detail referring to the following Examples and Comparative Examples. However, the present invention is not limited thereto.

Comparative Example

Polymerization, Compounding, and Injection Molding of Polyarylene Sulfide

1. Polyarylene Sulfide of Comparative Example 1
Ryton P6 polyarylene sulfide (Chevron Philips Company) was prepared. The prepared PAS of Comparative Example 1 was in the form of powder, had average particle diameter of 2 μm, moisture content of 1500 ppm, and organic solvent content of 110 ppm.

2. Polyarylene Sulfide of Comparative Example 2
Ryton PR26 (Chevron Philips Company) was prepared as polymerized grade polymer by the same method as Comparative Example 1 except that number average molecular weight is different. The PAS of Comparative Example 2 was in the form of powder, had average particle diameter of 1 μm, moisture content of 1900 ppm, and organic solvent content of 100 ppm.

3. Polyarylene Sulfide of Comparative Example 3
PAS of hb grade (Deyang Company) was prepared as polymerized grade polymer by the same method as Comparative Example 1, except that number average molecular weight is different. The PAS of Comparative Example 3 was in the form of powder, had average particle diameter of 0.1 mm, moisture content of 2000 ppm, and organic solvent content of 210 ppm.

4. Compounding and Injection Molding of the Polyarylene Sulfides of Comparative Examples 1 to 3
3 kinds of compositions comprising 40 wt % of commonly used glass fiber, 0.3 wt % of lubricant, 0.2 wt % of oxidation stabilizer, and remaining content of each PAS resin of Comparative Examples 1, 2, 3. And then, the compositions were introduced into a twin screw extruder and compounded (HAAKE Company, PolyLab System, 340° C.), and then, the injection mold temperature was fixed at 140° C., and the specimens were injection molded with an injection molding machine (Nissei Company, 110 tons, 320° C.).

EXAMPLE

Polymerization, Compounding and Injection Molding of Polyarylene Sulfide

1. Polymerization of Poyarylene sulfide of Example 1
Reactants including 4000 g of para diiodobenzene (pDIB), 10 g of a polymerization terminator (benzothiazyl disulfide), 340 g of sulfur and 15 g of a catalyst (1,3-diiodo-4-nitrobenzene) were melt mixed at 180° C. A polymerization reaction was conducted while raising the temperature of the mixture from 180° C. to 340° C., and reducing the pressure from atmospheric pressure to 10 torr. 5 hours after the polymerization was initiated, 5 g of sulfur was introduced, and then, the polymerization reaction was further progressed for 3 hours to obtain polymer (PAS).

After the polymerization, the polymer was dried at 160° C. for 2 hours. The obtained polymer had an average particle diameter of 4 mm, and moisture content of 150 ppm, and organic solvent content of 0 ppm.

2. Polymerization of Polyarylene Sulfide of Example 2
Reactants including 4000 g of para diiodobenzene (pDIB), 12 g of a polymerization terminator (benzothiazyl disulfide), 345 g of sulfur and 15 g of a catalyst (1,3-diiodo-4-nitrobenzene) were melt mixed at 180° C. A polymerization reaction was conducted while raising the temperature of the mixture from 180° C. to 340° C., and reducing the pressure from atmospheric pressure to 10 torr. 5 hours after the polymerization was initiated, 10 g of sulfur was introduced, and then, the polymerization reaction was further progressed for 4 hours to obtain polymer (PAS).

After the polymerization, the polymer was dried at 150° C. for 1 hour. The obtained polymer had an average particle diameter of 3 mm, and moisture content of 180 ppm, and organic solvent content of 0 ppm.

3. Polymerization of Polyarylene Sulfide of Example 3
Reactants including 4000 g of para diiodobenzene (pDIB), 15 g of a polymerization terminator (benzothiazyl disulfide), 340 g of sulfur and 15 g of a catalyst (1,3-diiodo-4-nitrobenzene) were melt mixed at 180° C. A polymerization reaction was conducted while raising the temperature of the mixture from 180° C. to 340° C., and reducing the pressure from atmospheric pressure to 10 torr. 5 hours after the polymerization was initiated, 15 g of sulfur was introduced, and then, the polymerization reaction was further progressed for 5 hours to obtain polymer (PAS).

After the polymerization, the polymer was dried at 140° C. for 1.5 hours. The obtained polymer had an average particle diameter of 5 mm, and moisture content of 200 ppm, and organic solvent content of 0 ppm.

4. Compounding and Injection Molding of Polyarylene Sulfide of Examples 1 to 3
3 kinds of compositions including 40 wt % of commonly used glass fiber, 0.3 wt % of lubricant, 0.2 wt % of oxidation stabilizer, and remaining content of each PAS resin of Examples 1, 2 and 3 were prepared. And then, the compositions were introduced into a twin screw extruder and compounded (HAAKE Company, PolyLab System, 340° C.), injection mold temperature was fixed at 140° C., and then, specimen was injection molded with an injection molding machine ((Nissei Company, 110 tons, 320° C.).

Meanwhile, the reactants of the polymerization reactions of Comparative Examples 1 to 3 and Examples 1 to 3, introduced amounts and times are described in the following Table 1.

TABLE 1

Preparation of polyarylene sulfide of Comparative Examples

| Comparative Example 1 | Ryton P6 (Chevron Philips Company) |
|---|---|
| Comparative Example 2 | Ryton PR26 (Chevron Philips Company) |
| Comparative Example 3 | hb grade (Deyang Company) |

Preparation of polyarylene sulfide of Examples

| | Reactants of Examples | | | Drying temperature (° C.) | Drying time (hr) |
|---|---|---|---|---|---|
| | pDIB(g) | S(g) | catalyst (g) | Polymerization terminator (g) | | |
| Example 1 | 4000 | 345 | 15 | 10 | 160 | 2 |
| Example 2 | 4000 | 355 | 15 | 12 | 150 | 1 |
| Example 3 | 4000 | 355 | 15 | 15 | 140 | 1.5 |

Experimental Example

Measurement of the Properties of the Polyarylene Sulfides of Comparative Examples and Examples 1. Particle Size Analysis of Polyarylene Sulfide The polyarylene sulfides obtained in Comparative Examples are in the form of powders, and the particle size was analyzed using a scanning electron microscope (Hitachi Company, S-300N). The polyarylene sulfides obtained in Examples are in the form of pellets of several mm size, and the particle size was analyzed using Vernier Calipers. The results of particle size analysis of the polyarylene sulfides obtained in Comparative Examples 1 to 3 and Examples 1 to 3 are described in the following Table 2.

2. Measurement of Residual Oganic Solvent Content in Polyarylene Sulfide

A certain amount of the samples (about 2 g) according to Comparative Examples and Examples were respectively sealed in 20 mL sealing vial, and heated at 180° C. for 30 minutes with HS (Head Space), and then, generated gas was automatically transferred to GC/MS(Gas chromatography-Mass Spectrometer) equipment. And then, each component was separated with a capillary column and qualitatively analyzed, and the content of each component in the sample was quantitatively analyzed using standard material (Benzothiazole).

3. Measurement of Residual Moisture Content in Polyarylene Sulfide

A certain amount of the sample was heated to 280° C., which is a melting point of the sample, using Karl Fischer Titrator, the gasified moisture was collected in a Karl Fischer solution using nitrogen gas, and then, moisture content was titrated using potential difference.

4. Analysis of Melt Viscosity

For property analysis of the polymers synthesized according to Comparative Examples and Examples, melt viscosity (MV) was measured at 300° C. with a rotating disk viscometer. To measure by Frequency sweep method, angular frequency was measured from 0.6 to 500 rad/s, and viscosity at 1.84 rad/s was defined as melt viscosity (M.V.). The measurement values are shown in the following Table 3.

5. Measurement of Melting Point (Tm)

Melting point was measured using Differential Scanning calorimeter (DSC) while increasing temperature from 30° C. to 320° C. at a rate of 10° C./min, cooling to 30° C., and then increasing temperature again from 30° C. to 320° C. at a rate of 10° C./min. The measurement values are shown in the following Table 3.

6. Evaluation of Specimen Surface Stain

After compounding the polyarylene sulfides of Comparative Examples and Examples (including 40 wt % of glass fiber), the surface stain of the specimen injection molded at a mold temperature of 140° C. was visually observed. The measurement values are shown in the following Table 3, wherein the visual evaluation method of the surface stain is as follows.

No: There is no surface stain or 2% or less surface stain in the injection molded specimen.

Yes: There is 4% or more surface stain in the injection molded specimen

Figure 2:
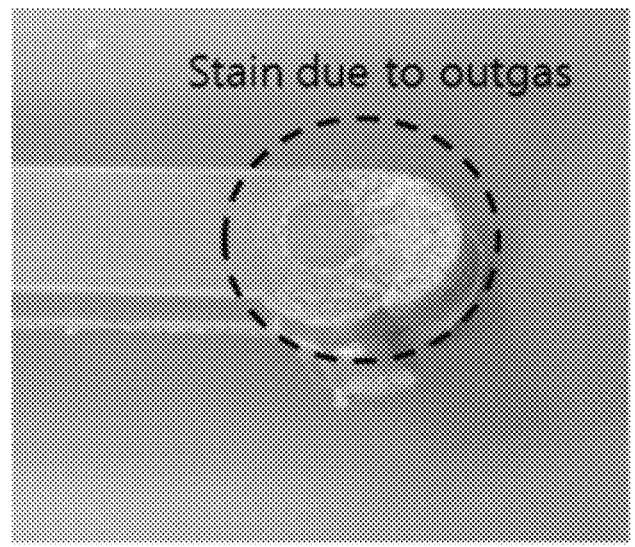
FIG. 2 is a photograph showing the surface of the injection molded specimen compounding polyarylene sulfide resin and glass fiber according to Comparative Example.

Representatively, photographs of the specimens according to Example 1 and Comparative Example 3 are respectively as shown in FIGS. 1 and 2.

7. Measurement of Tensile Strength

Tensile strength was measured according to the method described in ASTM D638. Specifically, a value measured when a type I specimen was pulled at a speed of 5 mm/min using UTM (Universal testing machine, Dong-il Shimadzu Corp. AG-X 10 kN) was determined as tensile strength. The measurement values are shown in the following Table 3.

TABLE 2

| | Average particle diameter of PAS | Standard deviation of the particle diameter of PAS |
|---|---|---|
| Comparative Example 1 | 2 μm | ±0.4 μm |
| Comparative Example 2 | 1 μm | ±0.2 μm |
| Comparative Example 3 | 0.1 mm | ±3 mm |
| Example 1 | 4 mm | ±0.5 mm |
| Example 2 | 3 mm | ±0.3 mm |
| Example 3 | 5 mm | ±0.6 mm |

TABLE 3

| | Residual solvent total content (ppm) | M.V. (Poise) | Tm (° C.) | Surface stain (140° C. mold) | Tensile strength (kgf/cm$^2$) |
|---|---|---|---|---|---|
| Comparative Example 1 | 1610 (110) | 1100 | 281 | Yes | 1580 |
| Comparative Example 2 | 2000 (100) | 1500 | 280 | Yes | 1490 |
| Comparative Example 3 | 2210 (210) | 2000 | 280 | Yes | 1350 |
| Example 1 | 150 (0) | 700 | 280 | No | 1690 |
| Example 2 | 180 (0) | 2000 | 280 | No | 1670 |
| Example 3 | 200 (0) | 1100 | 279 | No | 1630 | comment)
In the residual solvent content, the value in parenthesis means organic solvent content.

As shown in Tables 2 and 3, the products manufactured in Examples have low residual solvent content, and particularly, do not have residual organic solvent in the PAS resin, and thus, do not have stain on the surface of the specimen after injection molding. Furthermore, Examples 1 to 3 have excellent properties in terms of tensile strength. Meanwhile, Comparative Examples 1 to 3 have high moisture content and high residual solvent content including 100 ppm or more organic solvents, and thus, surface stains are generated and tensile strength is lowered.

Furthermore, FIGS. 1 and 2 respectively show the surface of compounded specimens according to Example and Comparative Example. As shown in FIG. 1, the specimen of Example does not show stain. Meanwhile, several stains are observed in the photograph of the specimen surface of Comparative Example.

From these results, it is interpreted that if large quantities of organic solvents are included as in the Comparative Examples, the organic solvents are gasified and contained in the product, thus causing the above phenomenon.

What is claimed is:

1. Polyarylene sulfide that is in the form of a pellet of 2 to 10 mm size immediately after polymerization, and has residual solvent content of 300 ppm or less, based on the total weight of the resin;
   wherein the polyarylene sulfide is produced by a method comprising polymerizing a diiodide aromatic compound and an initial amount of a sulfur compound;
   adding an additional amount of sulfur compound at a point after the addition of the initial amount of a sulfur compound; and
   drying the resulting polyarylene sulfide at 120 to 160° C. for 1 to 2 hours to give polyarylene sulfide in the form of a pellet of 2 to 10 mm size immediately after polymerization, and has residual solvent content of 300 ppm or less, based on the total weight of the resin.

2. The polyarylene sulfide according to claim 1, wherein the residual solvent includes water and an organic solvent.

3. The polyarylene sulfide according to claim 1, wherein the polyarylene sulfide has a number average molecular weight of 3,000 to 1,000,000.

4. The polyarylene sulfide according to claim 3, wherein the polyarylene sulfide has a number average molecular weight of 3,000 to 50,000.

5. The polyarylene sulfide according to claim 1, wherein degree of dispersion defined by weight average molecular weight to number average molecular weight is 2.0 to 4.0.

6. The polyarylene sulfide according to claim 1, wherein the polyarylene sulfide has a melting point of 265 to 320° C.

7. A product manufactured by molding the polyarylene sulfide according to claim 1.

8. The product according to claim 7, wherein the product is in the form of a film, a sheet, or fiber.

* * * * *